(12) United States Patent
Wang et al.

(10) Patent No.: US 8,115,740 B2
(45) Date of Patent: Feb. 14, 2012

(54) ELECTRONIC DEVICE CAPABLE OF EXECUTING COMMANDS THEREIN AND METHOD FOR EXECUTING COMMANDS IN THE SAME

(75) Inventors: John C. Wang, Taoyuan (TW); Yi Shen Wang, Taoyuan (TW); Hui Wen Wang, Taoyuan (TW)

(73) Assignee: High Tech Computer Corporation, Taoyuan (TW)

( * ) Notice: Subject to any disclaimer, the term of this patent is extended or adjusted under 35 U.S.C. 154(b) by 657 days.

(21) Appl. No.: 12/061,249

(22) Filed: Apr. 2, 2008

(65) Prior Publication Data

US 2008/0246742 A1    Oct. 9, 2008

(30) Foreign Application Priority Data

Apr. 4, 2007   (TW) .............................. 96111962 A

(51) Int. Cl.
   *G06F 3/041*   (2006.01)
(52) U.S. Cl. ........ 345/173; 345/174; 345/175; 345/176; 715/863; 715/864
(58) Field of Classification Search .................. None
   See application file for complete search history.

(56) References Cited

U.S. PATENT DOCUMENTS

| 5,347,295 | A | * | 9/1994 | Agulnick et al. | ............. 345/156 |
| 5,793,312 | A | * | 8/1998 | Tsubai | ............................ 341/22 |
| 6,952,597 | B2 | * | 10/2005 | Graham et al. | ............... 455/566 |
| 7,004,394 | B2 | * | 2/2006 | Kim | .......................... 235/472.01 |
| 7,495,659 | B2 | | 2/2009 | Marriott et al. | |
| 7,499,040 | B2 | | 3/2009 | Zadesky et al. | |
| 2003/0064686 | A1 | | 4/2003 | Thomason et al. | |
| 2003/0234768 | A1 | | 12/2003 | Rekimoto et al. | |
| 2004/0027341 | A1 | * | 2/2004 | Derocher | ....................... 345/173 |
| 2004/0145574 | A1 | * | 7/2004 | Xin et al. | ....................... 345/173 |
| 2005/0229117 | A1 | * | 10/2005 | Hullender et al. | ............. 345/173 |
| 2006/0146033 | A1 | * | 7/2006 | Chen et al. | ..................... 345/173 |
| 2007/0126708 | A1 | * | 6/2007 | Yang et al. | ..................... 345/173 |

FOREIGN PATENT DOCUMENTS

| CN | 1661624 A | 8/2005 |
| TW | I262427 B | 9/2006 |
| TW | I273467 B | 2/2007 |

* cited by examiner

*Primary Examiner* — Richard Hjerpe
*Assistant Examiner* — Christopher Thompson
(74) *Attorney, Agent, or Firm* — Lowe, Hauptman, Ham & Berner, LLP

(57) ABSTRACT

The present invention provides a method for executing commands in an electronic device having a touch sensing element. A stylus or finger is used to touch the touch sensing element and move through several sensing areas on the touch sensing element. A responsive signal is generated by the touch sensing element according to the touched sensing areas. A processor then executes a corresponding command in accordance with the responsive signal.

15 Claims, 7 Drawing Sheets

ELECTRONIC DEVICE CAPABLE OF EXECUTING COMMANDS THEREIN AND METHOD FOR EXECUTING COMMANDS IN THE SAME

CROSS REFERENCE TO RELATED APPLICATION

This application claims the priority benefit of Taiwan Patent Application Serial Number 096111962 filed Apr. 4, 2007, the full disclosure of which is incorporated herein by reference.

BACKGROUND OF THE INVENTION

1. Field of the Invention

The invention relates to a method for executing commands in an electronic device, and more particularly, to a method for executing commands based on sensing areas being touched in an electronic device.

2. Description of the Related Art

Nowadays, hand-held electronic devices are becoming more and more powerful, and their configurations are increasingly becoming more compact. In order to make data input easy for users, most hand-held electronic devices are provided with small keypads for users to enter numbers and/or characters into the devices or to launch desired applications therein. In addition, some mobile phones or personal digital assistants (PDAs) are provided with touch panels, instead of keypads, on which users can use a stylus to input numbers, characters or symbols. Moreover, most laptop computers are provided with touch pads, on which users can drag their fingers thereon, for replacing the use of a mouse. Besides, some of the laptop computers provide functions of using the touch pads to launch applications therein. More specifically, users can draw some specific symbols or patterns on the touch pads such that corresponding commands/applications can be executed on the computers.

No matter how the numbers, characters, symbols or patterns are entered into the devices with the touch panels or touch pads described above, all of the traces that a stylus or finger draws on the touch panels or touch pads are detected by a touch sensor thereof and then recognized to identify what information is input according to the traces.

However, different users always draw different traces on the touch panels or touch pads for the same pattern and even the same user does not always draw the same trace for the same pattern at different time. Therefore, the devices can not always exactly recognize what information is input. This will cause the devices not to exactly launch a desired application.

Furthermore, when the user intends to draws a specific character or pattern for launching a desired application, the user generally fails to intuitively associate the character or pattern with a corresponding application. More specifically, users have to painstakingly memorize the relation between the character/pattern and a corresponding application or constantly use it so that they can promptly and exactly launch the desired application by handwriting. For example, when a user intends to draw a triangle pattern "Δ" in order to launch an email application, the user usually fails to intuitively associate the triangle pattern with the email application. It is necessary to painstakingly memorize the relation between them. In addition, when one tells other users that the email application can be launched by drawing a triangle pattern on a touch panel or a touch pad, these users may not exactly launch it while drawing an irregular triangle pattern. In the absence of an intuitive relation to associate a pattern with an application, it is difficult to learn how to exactly launch an application by handwriting.

Accordingly, there exists a need to provide a method for executing commands in electronic device to solve the above-mentioned problems.

SUMMARY OF THE INVENTION

It is an object of the present invention to provide a method for executing commands in an electronic device, wherein the commands to be executed are determined in accordance with the sequence of sensing areas to be touched.

In order to achieve the above object, the method for executing commands in an electronic device according to the present invention is to implement at least one touch by a finger or a stylus touching a touch surface of a touch sensing element in the electronic device and moving the finger or the stylus through several sensing areas defined on the touch surface. The touch will cause the touch sensing element to generate a responsive signal corresponding to the touched sensing areas, and a processor then executes a corresponding command in accordance with the responsive signal.

The method for executing commands in an electronic device according to the present invention associates simple patterns with the commands to be executed. Therefore, it is easy for users to intuitively draw these simple patterns to execute the desired commands.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
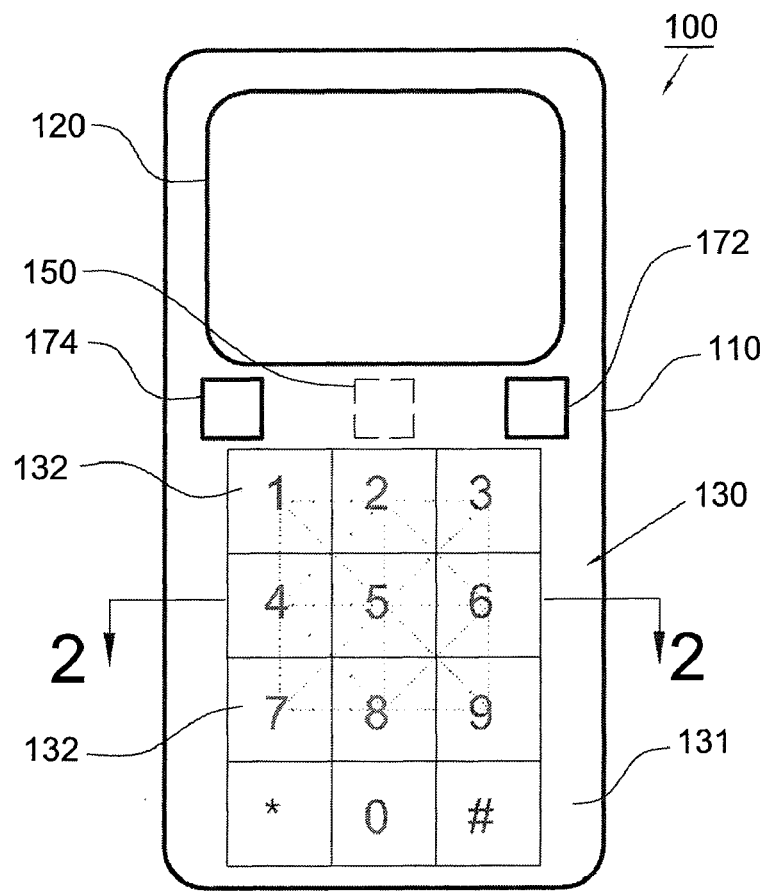
FIG. 1 illustrates an electronic device that a user can input commands therein according to the present invention.
Figure 2:
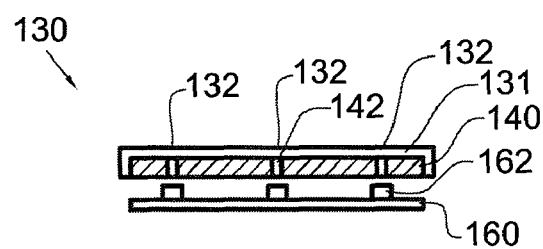
FIG. 2 is a cross-sectional view of the electronic device of FIG. 1 taken along line 2-2.

Referring to FIGS. 1 and 2, an electronic device 100, such as mobile phone, smart phone or personal digital assistant phone (PDA phone) has a housing 110. The housing 110 is provided with a display 120 and a touch sensing element 130, such as touch pad. The touch pad 130 includes a touch surface 131 and a touch sensor 140 disposed under the touch surface 131. The touch surface 131 can be made of plastics and defines a plurality of sensing areas 132 thereon, which are respectively labeled with numbers "0" to "9", and symbols "*" and "#" (a total of 12 sensing areas). When a certain sensing area 132 is touched, the touch sensor 140 will be activated to send a signal corresponding to the touched sensing area 132. According to the embodiment of the present invention, when a different sensing area 132 is touched, a different signal is sent by the touch sensor 140. In addition, it is preferred to dispose a plurality of light-emitting devices 162, such as light-emitting diode (LED), below the touch sensor 140. These light-emitting devices 162 are disposed on a circuit board 160 and are positioned to respectively correspond to the sensing areas 132. When a certain sensing area 132 is touched, the light-emitting device 162 corresponding to the touched sensing area 132 will be activated to light up. The light emitted by the lit-up light-emitting device 162 then will pass through the opening 142 of the touch sensor 140 and reach the touch surface 131 so as to illuminate the touched sensing area 132. In this way, one can easily identify which sensing areas 132 have been touched.

The electronic device 100 of the present invention can be operated in two input modes, wherein one is dial mode and the other is command input mode. When the device 100 is in the dial mode, the sensing areas 132 are adapted to input numbers labeled thereon. When the device 100 is in the command input mode, the sensing areas 132 are adapted to input a command into the device 100 to run an application. To switch the operating modes, one can press the switch button 172 on the housing 110 to switch between the two modes. The switch button 172 can be a touch-type button or a physical press-type button.

The electronic device of the present invention can be provided with various applications for users. These applications can be ones run on Microsoft® Windows-based mobile phone operating system, such as Windows Mobile operating system or on other mobile phone operating systems. The applications and definitions of commands detailed in the following description can be referred to those defined in Microsoft® Windows-based mobile phone operating system.

Figure 3:
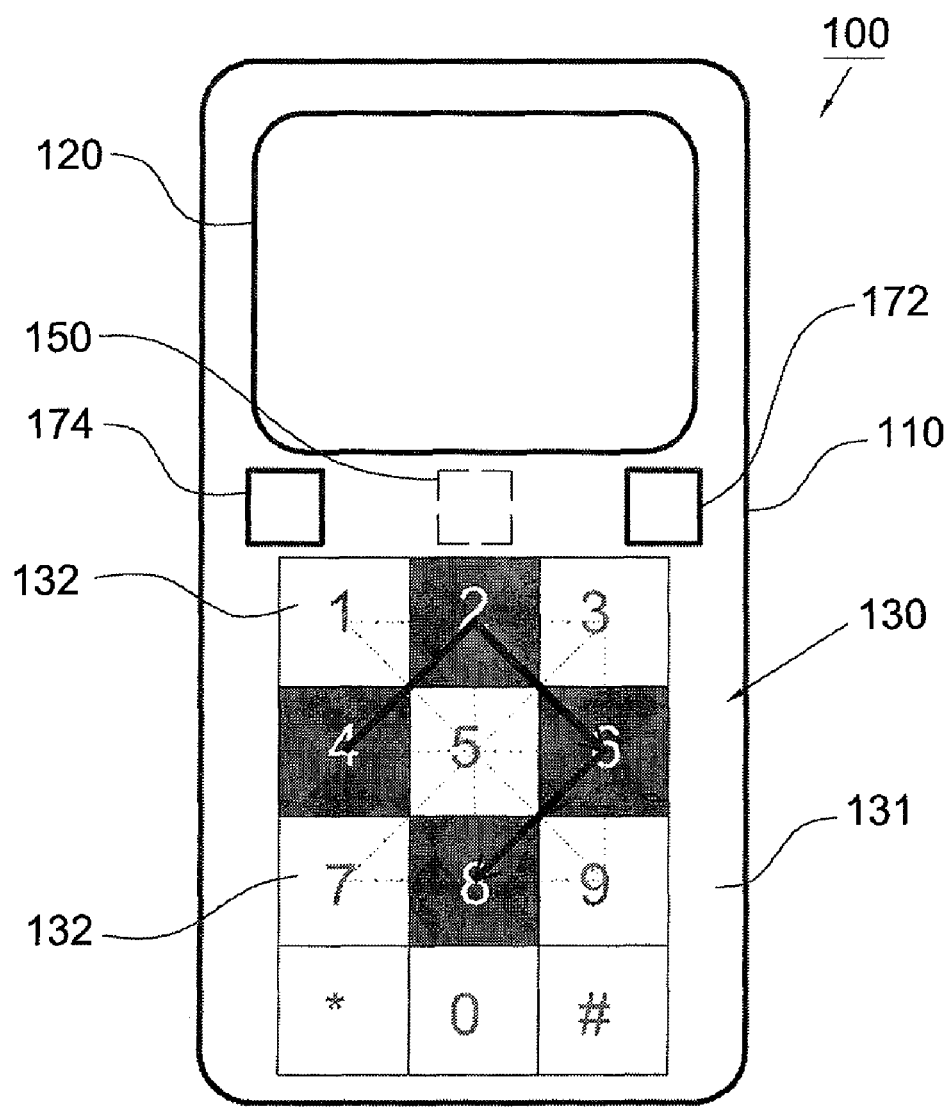
FIG. 3 illustrates a method for executing commands in the electronic device according to the present invention.

Referring to FIG. 3, when a user intends to execute a command in the electronic device 100, the user is required to touch the touch surface 131 by one finger and consecutively move the finger over the touch surface 131 to "trace out" a pattern. When the finger moves over different sensing areas 132 of the touch surface 131, a responsive signal is generated by the touch sensor 140 according to the touched sensing areas 132 and sent to a processor 150 inside the housing 110. The processor 150 then receives the responsive signal and executes a corresponding command based on the responsive signal. In addition, when the function of lighting up the light-emitting devices 162 is activated, the movement of the finger over the touch surface 131 will cause the light-emitting devices 162, which correspond to the touched sensing areas 132, to be lit up. For example, when the finger moves over the sensing areas 132 labeled with "4", "2", "6" and "8" in sequence, the light-emitting devices 162 corresponding to these touched sensing areas 132 will light up accordingly.

Figure 4A:
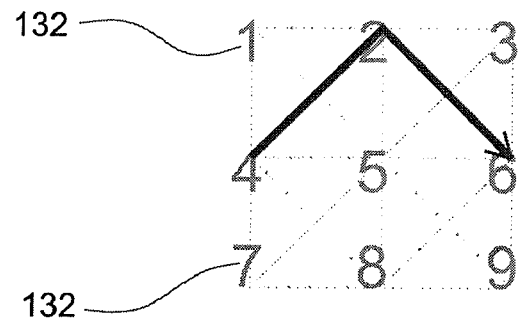
FIGS. 4a to 4l illustrate various exemplary implementations of the method for executing commands in the electronic device according to the present invention.

The sensing areas 132 labeled with "1" to "9" can be used for command input. For example, referring to FIGS. 1 and 4a, when a user intends to return to a default home screen on the display 120, that is, to execute a "Home" command, the user can move his/her finger over the touch surface 131 from the sensing area "4", through the sensing area "2" and finally to the sensing area "6". The path of the movement along the sensing areas "4"-"2"-"6" is in the shape of a rooftop, which symbolizes a home. Alternatively, the user can move his/her finger over the touch surface 131 from the sensing area "6", through the sensing area "2" and finally to the sensing area "4" to execute the same command.

Figure 4B:
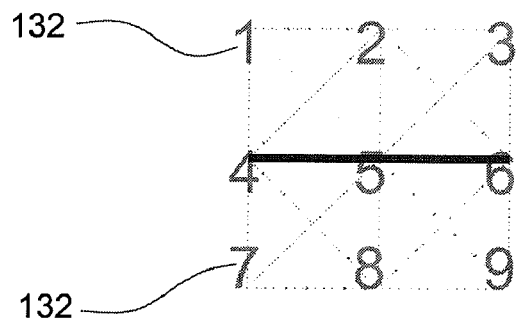

Referring to FIGS. 1 and 4b, when the user intends to move forward to next image page on the display 120, that is, to execute a "Next Page" command, the user can move his/her finger over the touch surface 131 from the sensing area "4", through the sensing area "5" and finally to the sensing area "6". The path of the movement along the sensing areas "4"-"5"-"6" is a horizontal line drawn from left to right, which denotes a forward movement. Similarly, when the user intends to move back to a previous image page on the display 120, that is, to execute a "Previous Page" command, the user can move his/her finger over the touch surface 131 from the sensing area "6", through the sensing area "5" and finally to the sensing area "4". The path of the movement along the sensing areas "6"-"5"-"4" is a horizontal line drawn from right to left, which denotes a backward movement.

Figure 4C:
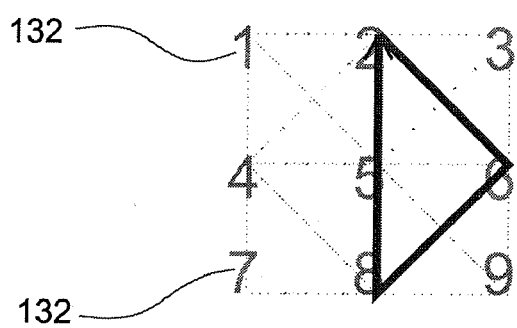

Referring to FIGS. 1 and 4c, when the user intends to launch a multimedia player, that is, to execute a "launch multimedia player" command, the user can move his/her finger over the touch surface 131 from the sensing area "2", through the sensing areas "6", "8" and "5" in sequence, and finally back to the sensing area "2". The path of the movement along the sensing areas "2"-"6"-"8"-"5"-"2" is in the shape of a play button on an audio device. In addition, the user can move his/her finger over the touch surface 131 from any one of the sensing areas "2", "6", "8" and "5" along the loop of the sensing areas "2"-"6"-"8"-"5"-"2", and finally back to the start sensing area to execute the same command.

Figure 4D:
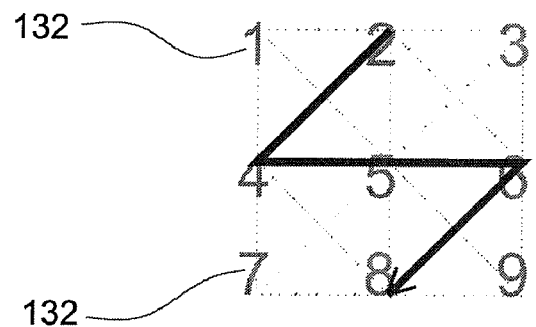

Referring to FIGS. 1 and 4d, when the user intends to activate a camera function, that is, to execute an "open camera" command, the user can move his/her finger over the touch surface 131 from the sensing area "2", through the sensing areas "4", "5" and "6" in sequence, and finally to the sensing area "8". The path of the movement along the sensing areas "2"-"4"-"5"-"6"-"8" is in the shape of a flashlight icon, which symbolizes a flashlight for camera. Alternatively, the user can move his/her finger along the sensing areas "8"-"6"-"5"-"4"-"2" in sequence to execute the same command.

Figure 4E:
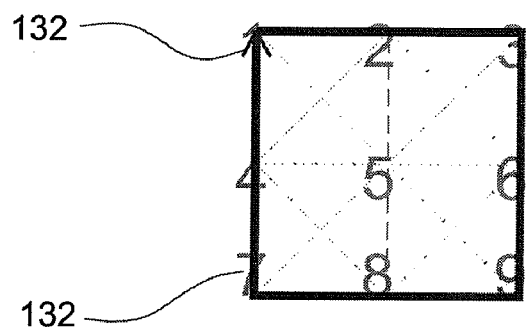

Referring to FIGS. 1 and 4e, when the user intends to open photo albums on the display 120, that is, to execute an "open photo album" command, the user can move his finger over the touch surface 131 from the sensing area "1", through the sensing areas "2", "3", "6", "9", "8", "7" and "4" in sequence, and finally back to the sensing area "1". The path of the movement along the sensing areas "1"-"2"-"3"-"6"-"9"-"8"-"7"-"4"-"1" is in the shape of a square, which symbolizes an album. In addition, the user can slide his/her finger over the touch surface 131 from any one of the sensing areas "1", "2", "3", "6", "9", "8", "7" and "4" along the loop of the sensing areas and finally back to the start sensing area to execute the same command.

Figure 4F:
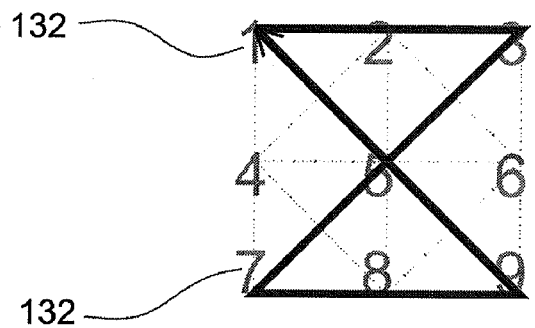

Referring to FIGS. 1 and 4f, when the user intends to open a calendar program on the display 120, that is, to execute an "open calendar" command, the user can move his/her finger over the touch surface 131 from the sensing area "1", through the sensing areas "2", "3", "5", "7", "8", "9" and "5" in sequence, and finally back to the sensing area "1". The path of the movement along the sensing areas "1"-"2"-"3"-"5"-"7"-"8"-"9"-"5"-"1" is in the shape of an hourglass, which symbolizes time. In addition, the user can move his/her finger over the touch surface 131 from any one of the sensing areas "1", "2", "3", "5", "7", "8" and "9" along the loop of the sensing areas "1"-"2"-"3"-"5"-"7"-"8"-"9"-"5"-"1", and finally back to the start sensing area to execute the same command.

Figure 4G:
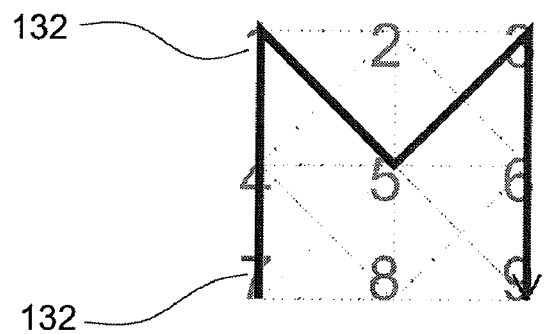

Referring to FIGS. 1 and 4g, if the user intends to open an e-mail program on the display 120, that is, to execute an "open e-mail" command, the user can move his/her finger over the touch surface 131 from the sensing area "7", through the sensing areas "4", "1", "5", "3" and "6" in sequence, and finally to the sensing area "9". The path of the movement along the sensing areas "7"-"4"-"1"-"5"-"3"-"6"-"9" is in the shape of a capital letter "M", which symbolizes mail. Alternatively, the user can move his/her finger along the sensing areas "9"-"6"-"3"-"5"-"1"-"4"-"7" in sequence to execute the same command.

Figure 4H:
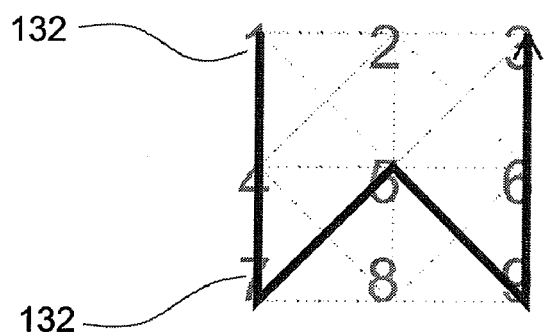

Referring to FIGS. 1 and 4h, when the user intends to browse the Internet, that is, to execute an "open browser" command, the user can move his/her finger over the touch surface 131 from the sensing area "1", through the sensing areas "4", "7", "5", "9" and "6" in sequence, and finally to the sensing area "3". The path of the movement along the sensing areas "1"-"4"-"7"-"5"-"9"-"6"-"3" is in the shape of a capital letter "W", which symbolizes worldwide web. Alternatively, the user can move his/her finger along the sensing areas "3"-"6"-"9"-"5"-"7"-"4"-"1" in sequence to execute the same command.

Figure 4I:
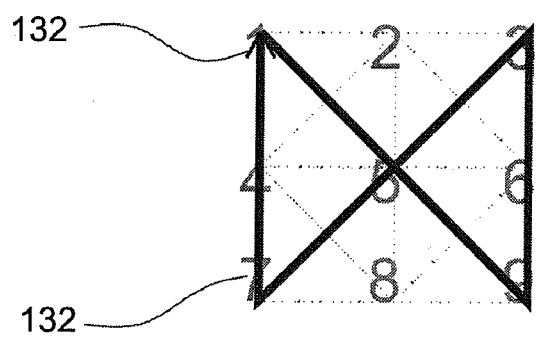

Referring to FIGS. 1 and 4i, when the user intends to open a contact program on the display 120, that is, to execute an "open contact list" command, the user can move his/her finger over the touch surface 131 from the sensing area "1", through the sensing areas "5", "9", "6", "3", "5", "7" and "4" in sequence, and finally back to the sensing area "1". The path of the movement along the sensing areas "1"-"5"-"9"-"6"-"3"-"5"-"7"-"4"-"1" is in the shape of two contact triangles with one vertex of one triangle pointing to one vertex of the other triangle, which symbolizes that two men are in contact with each other. In addition, the user can move his/her finger over the touch surface 131 from any one of the sensing areas "1", "5", "9", "6", "3", "7" and "4" along the loop of the sensing areas "1"-"5"-"9"-"6"-"3"-"5"-"7"-"4"-"1", and finally back to the start sensing area to execute the same command.

Figure 4J:
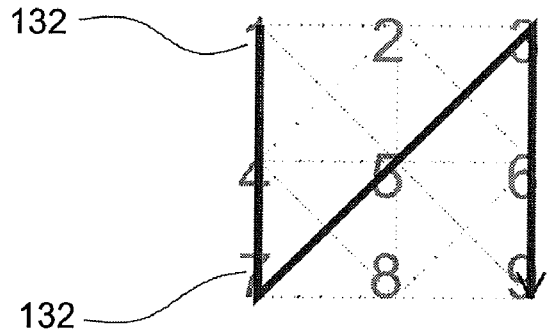

Referring to FIGS. 1 and 4j, when the user intends to open a communication manager application on the display 120 to wirelessly communicate the electronic device 100 with an external device, the user can move his/her finger over the touch surface 131 from the sensing area "1", through the sensing areas "4", "7", "5", "3" and "6" in sequence, and finally to the sensing area "9". The path of the movement along the sensing areas "1"-"4"-"7"-"5"-"3"-"6"-"9" is in the shape of a capital letter "N", which symbolizes that the electronic device 100 is able to communicate with an external device by network. Alternatively, the user can move his/her finger along the sensing areas "9"-"6"-"3"-"5"-"7"-"4"-"1" in sequence to execute the same command.

Figure 4K:
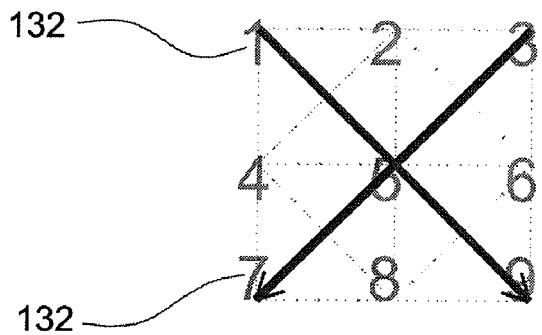

Referring to FIGS. 1 and 4k, when the user intends to execute a "cancel" command on the display 120, the user can move his/her finger over the touch surface 131 from the sensing area "3", through the sensing area "5" to the sensing area "7", and then from the sensing area "1" through the sensing area "5" and finally to the sensing area "9". The path of the movement along the sensing areas "3"-"5"-"7" together with the path along the sensing areas "1"-"5"-"9" is in the shape of a capital letter "X", which symbolizes a cancel. Alternatively, the user can move his/her finger from the sensing area "1" through the sensing area "5" to the sensing area "9", and then from the sensing area "3" through the sensing area "5" and finally to the sensing area "7" to execute the same command.

Figure 4L:
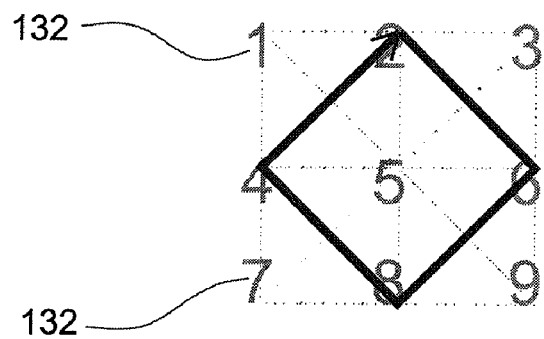

Referring to FIGS. 1 and 4l, when the user intends to confirm something on the display 120, that is, to execute an "O.K." command, the user can move his/her finger over the touch surface 131 from the sensing area "2", through the sensing areas "6", "8" and "4" in sequence, and finally back to the sensing area "2". The path of the movement along the sensing areas "2"-"6"-"8"-"4"-"2" is in the shape of a diamond-shaped "O", which symbolizes O.K. In addition, the user can move his/her finger over the touch surface 131 from any one of the sensing areas "2", "6", "8" and "4" along the loop of the sensing areas "2"-"6"-"8"-"4"-"2", and finally back to the start sensing area to execute the same command.

Therefore, when the user moves his/her finger over the touch surface 131 along the sensing areas "2"-"6"-"8"-"4"-"2" in sequence, the touch sensor 140 will generate a responsive signal corresponding to the touched sensing areas "2", "6", "8", "4" and "2". The processor 150 will receive the responsive signal and then execute an "O.K." command.

In order to make it easy to input a command, the sensing areas 132 are preferably arranged in a 3×3 array. Furthermore, it is preferable to perform a command input in a consecutive movement, for example, the exemplary implementations illustrated in FIGS. 4a to 4j and 4l. More specifically, a consecutive movement means that the finger consecutively moves on the sensing areas 132 until the finger removes from the touch surface 131. Additionally, the method for performing a command input in the electronic device 100 can be carried out in two or more consecutive movements. Specifically, a user moves his/her finger through several sensing areas 132 over the touch surface 131. After the user lifts his/her finger from the touch surface 131, the first consecutive slide is terminated. In a predetermined period of time, similarly to the first consecutive movement, the finger touches the touch surface 131 again to start the second consecutive movement through several sensing areas 132. Such an exemplary implementation is illustrated in FIG. 4k. When more consecutive movements are used to achieve a command input, there will be an increase in patterns for command input accordingly. This will therefore increase the number of the commands that can be used for the purpose of executing commands in the present invention.

According to the method for executing commands in an electronic device of the present invention, when a first touch occurs, that is when a user moves his/her finger to implement a first consecutive movement through at least two of the sensing areas 132, the first touch will cause the touch sensing element 130 to generate a first responsive signal which is corresponding to the touched sensing areas 132 the first touch moves through. After the user lifts his/her finger from the touch surface 131 to terminate the first touch, a first command based on the first responsive signal will be executed by the processor 150 if a second touch on the touch surface 131 is not detected within a predetermined period of time. If the second touch on the touch surface 131 is detected within the predetermined period of time and the finger moves through at least two of the sensing areas 132, the touch sensing element 130 will generate a second responsive signal, which is corresponding to the touched sensing areas 132 the second touch moves through. The processor 150 will then execute a second command based on the first and second responsive signals. Furthermore, in order to expedite the execution of command, one can press an execution button 174 positioned on the housing 110 upon the termination of the touch on the touch surface 131. The processor 150 will shortly execute the command based on the responsive signal. Therefore, there is no need to waste that extra predetermined period of time on waiting for the execution of command.

Figure 5:
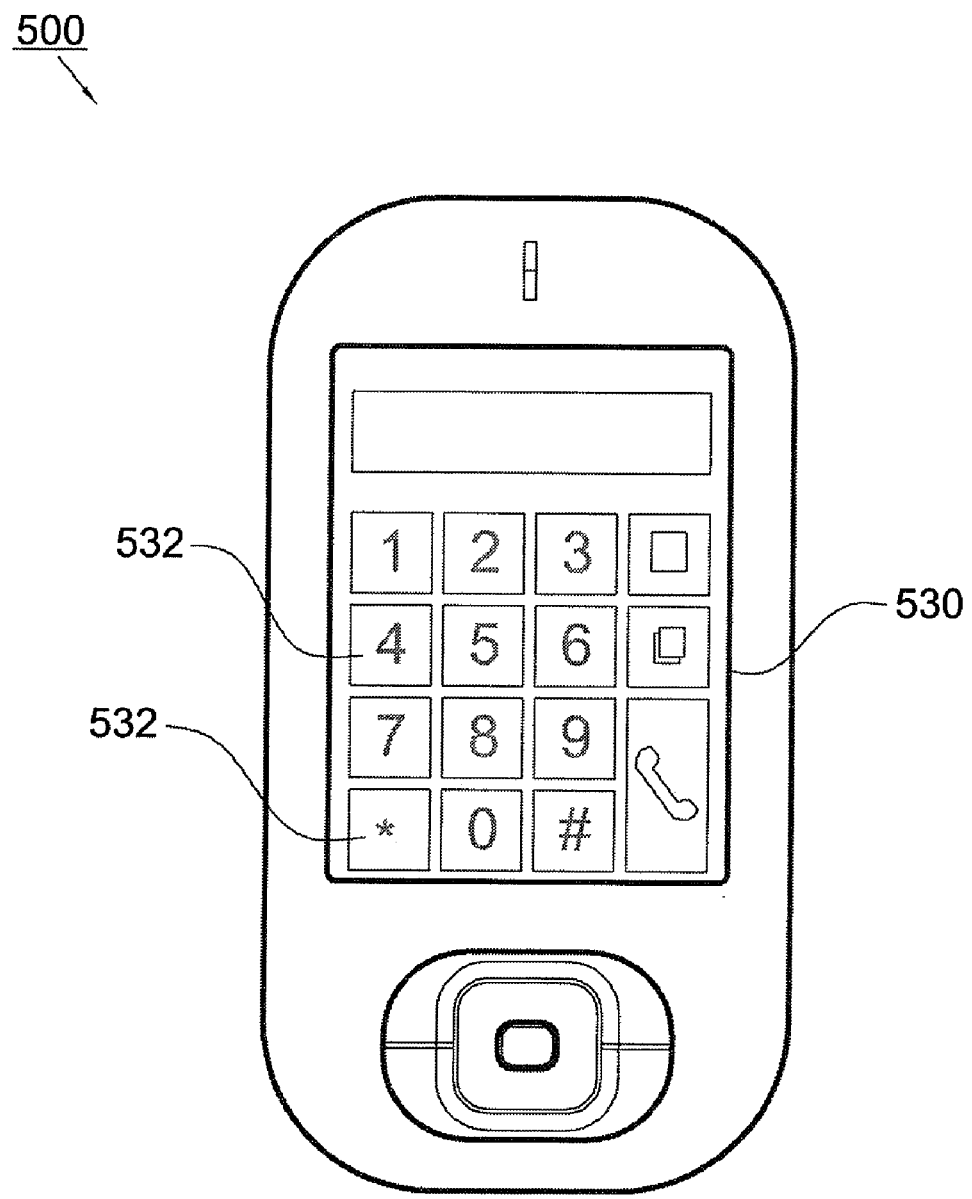
FIG. 5 illustrates another electronic device that a user can input commands therein according to the present invention.

Referring to FIG. 5, the method for executing commands in an electronic device according to the present invention can also be performed in an electronic device 500 with a touch panel, such as a PDA phone. The electronic device 500 includes a touch panel 530, which defines a plurality of sensing areas 532 thereon. Similarly to the touch pad 130 illustrated in FIGS. 1 and 2, when a certain sensing area 532 is touched, the touch panel 530 will send a responsive signal corresponding to the touched sensing area 532. When the electronic device 500 is in the command input mode and one moves his/her finger or a stylus through several sensing areas 532 consecutively, a processor (not shown) in the electronic device 500 will execute a command based on the responsive signal generated according to the touched sensing areas 532. This is similar to the method for executing commands as detailed above as to the electronic device 100. Thus, any further illustrations of the method for executing commands in the electronic device 500 will be omitted herein. Additionally, the electronic device 500 can be designed to instantaneously display the finger/stylus traces on the sensing areas 532 on the display 530 accordingly. This will facilitate the user to identify which sensing areas 532 have been touched.

Moreover, although the exemplary examples given above are illustrated in a 3×3 array of sensing areas, the method for executing commands in an electronic device according to the present invention is not limited to the use of a 3×3 array to input commands. More or even less than nine sensing areas can be used for the purpose of command input. This will increase the flexibility in designing the device.

The method for executing commands in an electronic device of the present invention is in accordance with the sequence of the touched sensing areas to determine which command will be executed. The present invention is different from the conventional method of executing commands, in which an arbitrary handwriting pattern is used to determine which command will be executed. More specifically, the method for executing commands in an electronic device according to the present invention provides visible reference points for users to input commands. This can avoid an unambiguously handwriting command input and thus can improve the recognition of commands. Moreover, the method for executing commands in an electronic device according to the present invention associates simple patterns with the commands desired to be executed. One can intuitively draw these simple patterns on the dial pad or dial panel to execute the desired commands. Therefore, it is easy for users to memorize the relation between them.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method of program opening in an electronic device having a touch sensing element and a display, the touch sensing element having a touch surface and a 3×3 array of sensing areas defined on the touch surface, the sensing areas being identified, from left to right and then from top to bottom, as a first sensing area, a second sensing area, a third sensing area, a fourth sensing area, a fifth sensing area, a sixth sensing area, a seventh sensing area, an eighth sensing area, and a ninth sensing area, respectively, the method comprising:
   detecting occurrence of successive touches from the first sensing area through the second, third, fifth, seventh, eighth, ninth, fifth, and first sensing areas on the touch surface by the touch sensing element;
   generating a responsive signal corresponding to the occurrence of the successive touches by the touch sensing element; and
   in accordance with the responsive signal, opening on the display a calendar program that corresponds to the responsive signal.

2. The method as claimed in claim 1, wherein the electronic device further has an execution button, the method further comprising:
   detecting a termination of the occurrence of the successive touches on the touch surface; and
   in response to a pressing of the execution button, starting the opening of the program after the termination of the occurrence of the successive touches is detected.

3. The method as claimed in claim 1, wherein the electronic device operates in either a dial mode or a command input mode, when the electronic device is in the dial mode, the sensing areas are adapted to input numbers; and when the electronic device is in the command input mode, the sensing areas are adapted to detect a path of movement of the successive touches.

4. The method as claimed in claim 3, wherein the electronic device further has a switch button, the method further comprising:
   detecting a pressing of the switch button; and
   switching the electronic device between the dial mode and the command input mode after the pressing of the switch button is detected.

5. The method as claimed in claim 1, wherein the touch sensing element is a touch panel, the method further comprising:
   displaying a trace of movement of the successive touches on the touch panel.

6. A method of command execution in an electronic device having a touch sensing element and a display, the touch sensing element having a touch surface and a 3×3 array of sensing areas defined on the touch surface, the 3×3 sensing areas being identified, from left to right and then from top to bottom, as a first sensing area, a second sensing area, a third sensing area, a fourth sensing area, a fifth sensing area, a sixth sensing area, a seventh sensing area, an eighth sensing area, and a ninth sensing area, respectively, the method comprising:
   detecting occurrence of successive touches from the fourth sensing area through the second sensing area and finally to the sixth sensing area on the touch surface by the touch sensing element;
   generating a responsive signal corresponding to the occurrence of the successive touches by the touch sensing element; and
   in accordance with the responsive signal, executing a "home" command that corresponds to the responsive signal to show a default home screen on the display.

7. The method as claimed in claim 6, wherein the electronic device further has an execution button, the method further comprising:
   detecting a termination of the occurrence of the successive touches on the touch surface; and
   in response to a pressing of the execution button, starting the execution of the command after the termination of the occurrence of the successive touches is detected.

8. The method as claimed in claim 6, wherein the electronic device operates in either a dial mode or a command input mode, when the electronic device is in the dial mode, the sensing areas are adapted to input numbers; and when the electronic device is in the command input mode, the sensing areas are adapted to detect a path of movement of the successive touches.

9. The method as claimed in claim 8, wherein the electronic device further has a switch button, the method further comprising:
   detecting a pressing of the switch button; and
   switching the electronic device between the dial mode and the command input mode after the pressing of the switch button is detected.

10. The method as claimed in claim 6, wherein the touch sensing element is a touch panel, the method further comprising:

displaying a trace of movement of the successive touches on the touch panel.

11. A method of command execution in an electronic device having a touch sensing element and a display, the touch sensing element having a touch surface and a 3×3 array of sensing areas defined on the touch surface, the 3×3 sensing areas being identified, from left to right and then from top to bottom, as a first sensing area, a second sensing area, a third sensing area, a fourth sensing area, a fifth sensing area, a sixth sensing area, a seventh sensing area, an eighth sensing area, and a ninth sensing area, respectively, the method comprising:

detecting occurrence of successive touches from the second sensing area through the fourth, fifth, and sixth sensing areas in sequence, and finally to the eighth sensing area on the touch surface by the touch sensing element;

generating a responsive signal corresponding to the occurrence of the successive touches by the touch sensing element; and in accordance with the responsive signal, executing an "open camera" command that corresponds to the responsive signal to activate a camera function on the display.

12. The method as claimed in claim 11, wherein the electronic device further has an execution button, the method further comprising:

detecting a termination of the occurrence of the successive touches on the touch surface; and in response to a pressing of the execution button, starting the execution of the command after the occurrence of the termination of the successive touches is detected.

13. The method as claimed in claim 11, wherein the electronic device operates in either a dial mode or a command input mode, when the electronic device is in the dial mode, the sensing areas are adapted to input numbers; and when the electronic device is in the command input mode, the sensing areas are adapted to detect a path of movement of the successive touches.

14. The method as claimed in claim 13, wherein the electronic device further has a switch button, the method further comprising:

detecting a pressing of the switch button; and switching the electronic device between the dial mode and the command input mode after the pressing of the switch button is detected.

15. The method as claimed in claim 11, wherein the touch sensing element is a touch panel, the method further comprising:

displaying a trace of movement of the successive touches on the touch panel.

* * * * *